(No Model.)
N. W. HOLT.
DRIVE CHAIN.
No. 270,433. Patented Jan. 9, 1883.
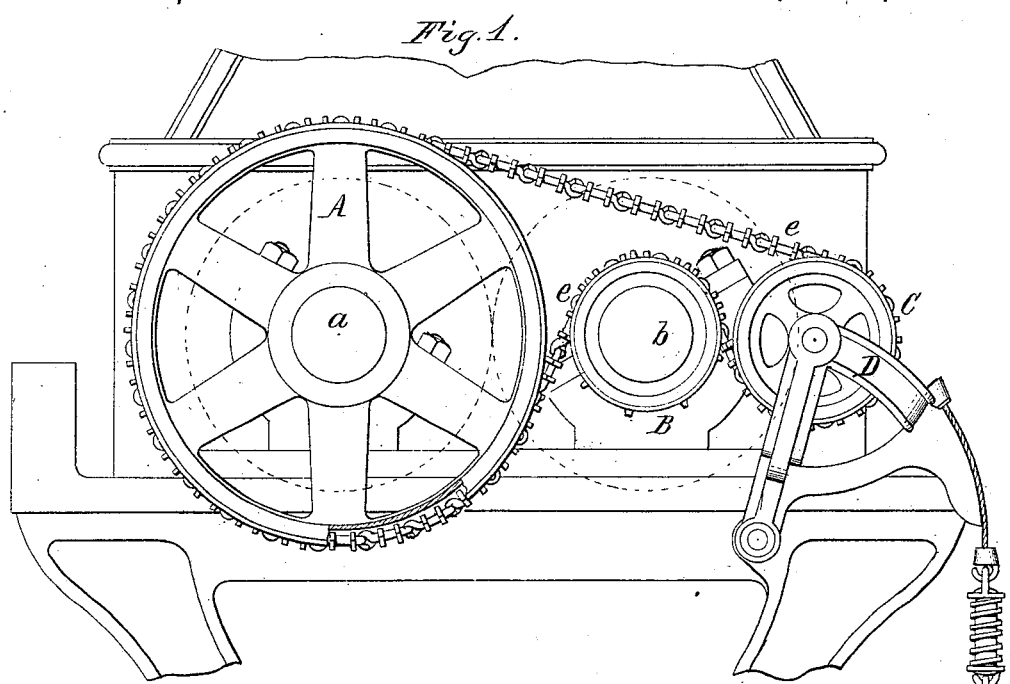
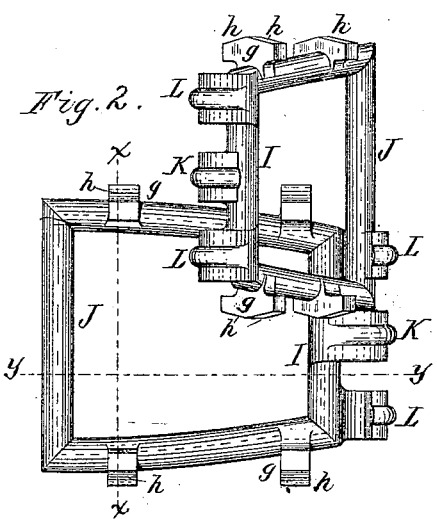
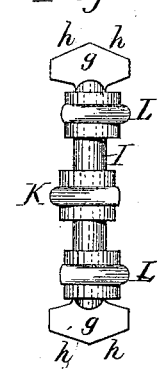
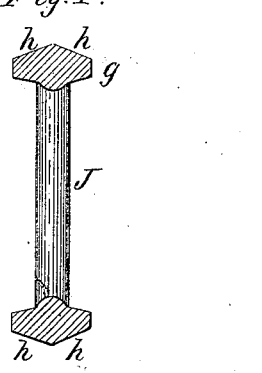
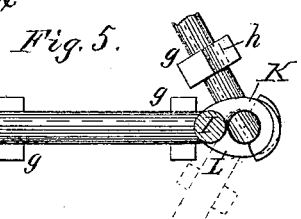
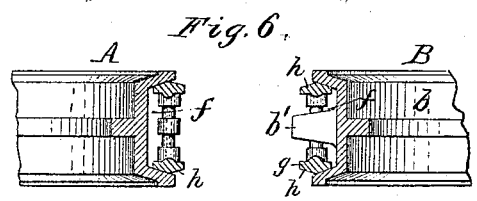
Witnesses:
Chas. J. Buchheit
Theo. L. Popp
Noah W. Holt, Inventor.
By Wilhelm & Bonner
Attorneys.
N. PETERS, Photo-Lithographer, Washington, D. C.

UNITED STATES PATENT OFFICE.

NOAH W. HOLT, OF BUFFALO, NEW YORK.

DRIVE-CHAIN.

SPECIFICATION forming part of Letters Patent No. 270,433, dated January 9, 1883.

Application filed August 12, 1882. (No model.)

*To all whom it may concern:*

Be it known that I, NOAH W. HOLT, of the city of Buffalo, in the county of Erie and State of New York, have invented a new and useful Improvement in Drive-Chains, of which the following is a specification.

This invention relates to that class of endless chains which are composed of detached links and employed for transmitting motion from one wheel or pulley to another.

My invention has the object to enable the chain to be used in connection with pulleys which have their faces provided with smooth V-shaped grooves, and which are arranged both on the inner and outer sides of the chain; and my invention consists, to that end, of a chain in which the links are provided on both sides with projecting lugs having salient V-shaped or double-inclined faces, which are adapted to engage in the V-shaped grooves of pulleys arranged on the inner and outer sides of the chain, as will be hereinafter fully set forth.

In the accompanying drawings, Figure 1 is a side elevation of a roller-mill to which my improved drive-chain is applied. Fig. 2 is a view of two of the links, one being partially connected with the other. Fig. 3 is a view of that end of a link to which the hooks are applied. Fig. 4 is a cross-section in line $xx$, Fig. 2. Fig. 5 is a longitudinal section in line $yy$, Fig. 2. Fig. 6 is a cross-section showing two links of the chain engaged with pulleys arranged on opposite sides of the chain.

Like letters of reference refer to like parts in the several figures.

A and B represent two pulleys secured to the shafts $a$ and $b$ of a roller-mill, and C is a tightener-pulley, which is mounted in an adjustable swinging frame, D.

$e$ represents an endless drive-chain running around the pulleys A, B, and C, the pulleys A and C being arranged on the inner side of the chain and the pulley B on the outer side thereof. The pulleys A B C have their faces provided with grooves $f$, having inclined sides, the grooves being narrowest at the bottom, as clearly shown in Fig. 6. The side bars of the links are provided with lugs $g$, having salient V-shaped or double-inclined faces $h$, the inclined faces of the lugs $g$ fitting against the inclined sides of the grooves $f$. As the faces of the lugs $g$ are inclined in opposite directions, they are adapted to engage with grooved pulleys located both on the inner and outer sides of the chain, as represented in Fig. 6. The frictional contact of the inclined faces of the lugs $g$ with the inclined sides of the grooves $f$ is sufficient to transmit the motion from the chain to the pulley, or vice versa, if the pulley affords sufficient holding-surface, and the sprockets usually employed on chain-wheels are therefore in such cases omitted. If one of the pulleys is very small in diameter—as, for instance, the pulley B in the drawings—such pulley is provided with sprockets $b'$, which prevent the chain from slipping. As the other pulleys are without sprockets, the chain adjusts itself readily on the pulleys and the parts move with very little noise.

I represents the short end bar, and J the long end bar, of each link of which the chain is composed, the side bars being curved to connect these end bars, as shown.

K represents a hook, arranged centrally on the short end bar, I, and L L are two hooks formed on both ends of the bar I, and having their openings turned in a direction contrary to that in which the opening of the central hook, K, is turned. The hooks K L are made of such size as to hold the long end bar, J, of the adjacent link securely, while permitting said bar to turn in the hooks, and the outer hooks, L, are arranged at such distance from each other that the side bars of the link will swing clear of the outer sides of the hooks L. The links are attached to each other by passing the long end bar, J, and one of the side bars first through the opening in one of the end hooks, L, then turning the link so as to bring the side bar opposite the opening in the central hook, K, then passing the end and side bars through this hook, then turning the link back so as to bring the side bar opposite the opening in the end hook, L, and then passing the side and end bars through this hook.

It is obvious that the links can only be separated by a series of movements in an inverse order and direction, whereby the accidental separation of the links is rendered impossible, as the chain, when in actual use, does not permit of such movements of the link. Each link is readily cast complete of malleable iron or other suitable metal in the usual manner.

I desire to limit this application to the specific improvement claimed, reserving the right to claim all other novel features in separate applications.

I am aware that chain-links have been provided with hooks turned in opposite directions for connecting the links, and this I do not claim; but

I claim as my invention—

A link for drive-chains provided with laterally-projecting lugs $g$, having salient V-shaped or double-inclined faces $h$ above and below the plane in which the chain moves, substantially as set forth.

NOAH W. HOLT.

Witnesses:
JNO. J. BONNER,
CHAS. F. GEYER.